United States Patent [19]

Yamato et al.

[11] 4,448,178
[45] May 15, 1984

[54] ELECTRONIC FUEL SUPPLY CONTROL SYSTEM FOR INTERNAL COMBUSTION ENGINES, HAVING EXHAUST GAS RECIRCULATION CONTROL

[75] Inventors: Akihiro Yamato, Sayama; Shigeo Umesaki, Iruma, both of Japan

[73] Assignee: Honda Motor Co., Ltd., Tokyo, Japan

[21] Appl. No.: 440,542

[22] Filed: Nov. 10, 1982

[30] Foreign Application Priority Data

Nov. 11, 1981 [JP] Japan .................................. 56-180764

[51] Int. Cl.³ .............................................. F02M 25/06
[52] U.S. Cl. ...................................... 123/571; 123/489
[58] Field of Search ................. 123/571, 569, 568, 489

[56] References Cited

U.S. PATENT DOCUMENTS

| | | | |
|---|---|---|---|
| 4,210,112 | 7/1980 | Nakamura et al. | 123/571 |
| 4,280,471 | 7/1981 | Masaki | 123/571 |
| 4,325,347 | 4/1982 | Yamaguchi | 123/571 |
| 4,388,909 | 6/1983 | Ogasawara et al. | 123/569 X |
| 4,399,791 | 8/1983 | Kobayasiti et al. | 123/571 |

*Primary Examiner*—Wendell E. Burns
*Attorney, Agent, or Firm*—Arthur L. Lessler

[57] ABSTRACT

In an electronic fuel supply control system for an internal combustion engines, the fuel quantity being supplied to the engine is set to different values in accordance with the operating condition of the engine, between when the exhaust gas recirculation is operated and when it is not operated, for achieving proper air/fuel ratios. Further, immediately after a valve lift command is outputted at full closing of the exhaust gas recirculation valve, which is indicative of opening of the valve, a quantity of fuel set as applicable when the exhaust gas recirculation is not operated is supplied to the engine until the actual valve opening increases to a predetermined value. Immediately after a valve lift command is outputted at opening of the valve, which is indicative of full closing of the valve, a quantity of fuel set as applicable when the exhaust gas recirculation is operated is supplied to the engine until the actual valve opening decreases to a predetermined value. Thus a response lag of the exhaust gas recirculation valve is compensated for.

10 Claims, 14 Drawing Figures

ELECTRONIC FUEL SUPPLY CONTROL SYSTEM FOR INTERNAL COMBUSTION ENGINES, HAVING EXHAUST GAS RECIRCULATION CONTROL

BACKGROUND OF THE INVENTION

This invention relates to a fuel supply control system for internal combustion engines equipped with exhaust gas recirculation systems, and more particularly to an electronic fuel supply control system which is adapted to perform air/fuel ratio control in dependence upon the exhaust gas recirculating operation.

A fuel supply control system adapted for use with an internal combustion engine, particularly a gasoline engine has been proposed e.g. by U.S. Ser. No. 348,648 now U.S. Pat. No. 4,445,483 assigned to the assignee of the present application, which is adapted to determine the valve opening period of a fuel injection device for control of the fuel injection quantity, i.e. the air/fuel ratio of an air/fuel mixture being supplied to the engine, by first determining a basic value of the above valve opening period as a function of engine rpm and intake pipe absolute pressure and then adding to and/or multiplying same by constants and/or coefficients being functions of engine rpm, intake pipe absolute pressure, engine temperature, throttle valve opening, exhaust gas ingredient concentration (oxygen concentration), etc., by electronic computing means.

In using a fuel control system of the above type in combination with an engine equipped with an exhaust gas recirculation system for returning part of exhaust gases to the intake passage of the engine for improving the emission characteristics, it is necesary to set the basic value of the fuel supply quantity or valve opening period to values in accordance with the quantity of recirculated exhaust gases, so as to always achieve an air/fuel ratio of the mixture being supplied to the engine, which is appropriate to the operating condition of the engine. Further, an exhaust gas recirculation system in general uses an exhaust gas recirculation valve of the negative pressure-actuated type. However, such type valve has some response lag in its valve lifting action. Therefore, means has to be provided for compensating for such response lag in the valve lifting action in order to achieve highly accurate fuel supply control.

OBJECTS AND SUMMARY OF THE INVENTION

It is an object of the invention to provide an electronic fuel supply control system for use with an internal combustion engine, in which the fuel quantity being supplied to the engine is set to different values between when the exhaust gas recirculation is operated and when it is not operated, to thereby obtain an air/fuel ratio best suited for the operating condition of the engine for improvement of the emission characteristics, fuel consumption and driveability of the engine.

It is a further object of the invention to provide an electronic fuel supply control system for use with an internal combustion engine, which is adapted to control the fuel supply quantity so as to compensate for a response lag in the valve lifting action of the exhaust gas recirculation valve, for further improvement of the emission characteristics, fuel consumption and driveability of the engine.

The present invention provides an electronic fuel supply control system adapted for use with an internal combustion engine which has an intake passage, an exhaust passage, exhaust gas recirculating means for returning part of the exhaust gases from the exhaust passage to the intake passage, and fuel delivery means. The electronic fuel supply control system comprises: means for driving the fuel delivery means; first sensor means for detecting a first parameter representing operating condition of the engine and generating a first signal indicative of a detected value of the first parameter; second sensor means for detecting a second parameter also representing the operating condition of the engine and generating a second signal indicative of a detected value of the second parameter; first memory means storing a first group of predetermined output values being functions of the first and second signals; second memory means storing a second group of predetermined output values being functions of the first and second signals but different from the predetermined output values in the first group; means for determining whether or not the exhaust gas recirculation is being carried out by the exhaust gas recirculating means; and selector means responsive to an output signal from the determining means to selectively allow one of the first and second groups of predetermined output values in the first and second memory means to be supplied to the above driving means. The driving means is operable to drive the fuel delivery means so as to supply quantities of fuel corresponding to output values in the selected one of the first and second groups to the engine.

The exhaust gas recirculating means comprises an exhaust gas recirculating passage connecting the exhaust passage of the engine to the intake passage of same, and an exhaust gas recirculation valve arranged across the exhaust gas recirculating passage. The fuel supply control system also includes valve opening command means for generating a command signal indicative of command values for required valve opening of the exhaust gas recirculation valve, third sensor means for detecting the valve opening of the exhaust gas recirculation valve and generating a signal indicative of a detected value of the actual valve opening, and control means responsive to the difference between a value of the actual valve opening signal and a command value indicated by the command signal for controlling the valve opening of the exhaust gas recirculation valve.

The exhaust gas recirculating operation determining means comprises arithmetic means for multiplying a command value indicated by the command signal, which is outputted when the exhaust gas recirculation valve is fully closed, and indicative of opening of the same valve or a command value indicated by the command signal, immediately preceding one which is outputted when the valve is opened, and indicative of full closing of the same valve, by a predetermined coefficient having a value less than 1, and generating the resulting product value, and determining means for comparing the product value with a value of the actual valve opening signal, to determine that the exhaust gas recirculation is being carried out, when the product value is smaller than the value of the actual valve opening signal, and that the exhaust gas recirculation is not being carried out, when the former is equal to or larger than that latter. With this arrangement, immediately after the command value indicative of opening of the exhaust gas recirculation valve is outputted at full closing of the valve, a quantity of fuel set as applicable during the exhaust gas recirculation is not operated to the engine until the actual valve opening increases to a predetermined value, whereas when the command value indicative of full closing of the valve is outputted when the valve is opened, a quantity of fuel set as applicable when the exhaust gas recirculation is supplied, is supplied to the engine until the actual valve opening decreases to a predetermined value, to thereby compensate for a response lag of the exhaust gas recirculation valve.

The above and other objects, features and advantages of the invention will be more apparent from the ensuing detailed description taken in connection with the accompanying drawings.

DETAILED DESCRIPTION

The present invention will be described in detail with reference to the drawings in which an embodiment of the invention is illustrated.

Figure 1:
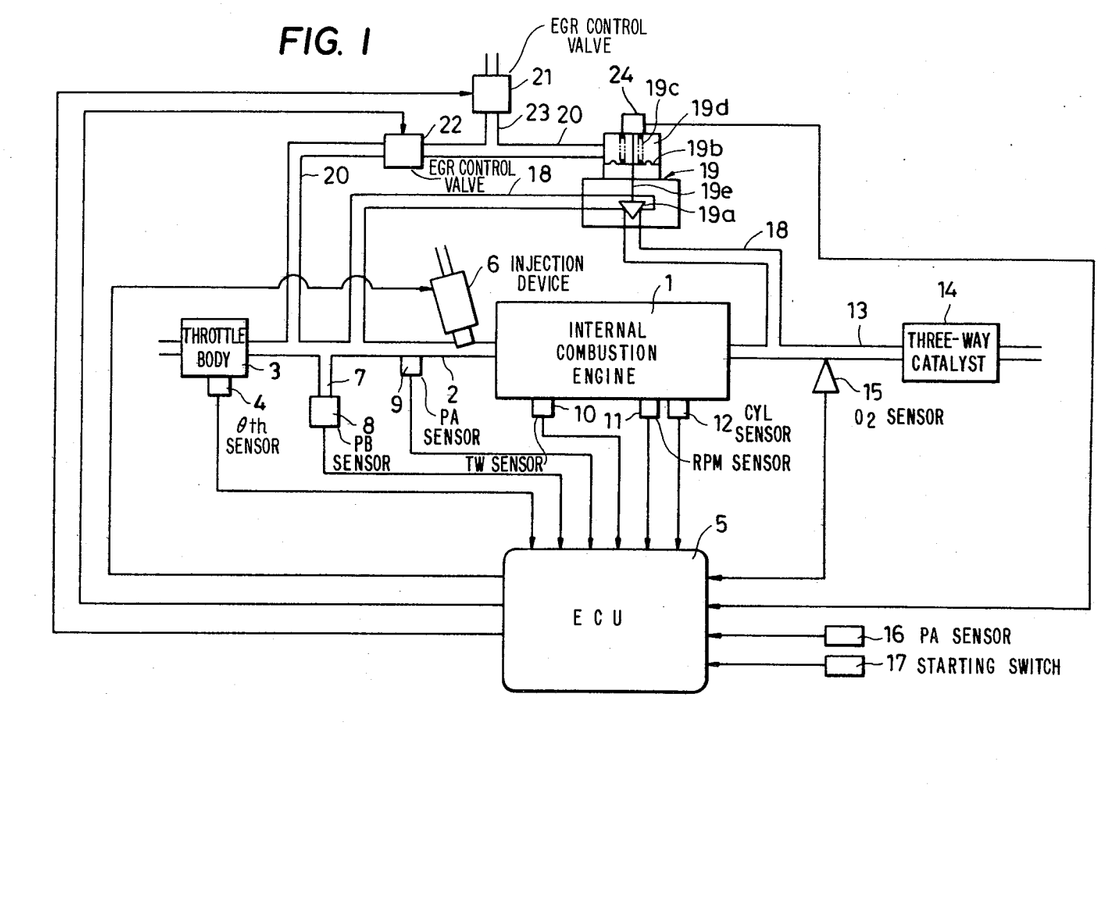
FIG. 1 is a block diagram illustrating a fuel supply control system according to an embodiment of the present invention.

Referring first to FIG. 1, there is illustrated the whole arrangement of a fuel supply control system for internal combustion engines, according to the present invention. Reference numeral 1 designates an internal combustion engine which may be a four-cylinder type, for instance. This engine 1 has main combustion chambers which may be four in number and sub combustion chambers communicating with the main combustion chambers, none of which is shown. An intake pipe 2 is connected to the engine 1, which comprises a main intake pipe communicating with each main combustion chamber, and a sub intake pipe with each sub combustion chamber, respectively, neither of which is shown. Arranged across the intake pipe 2 is a throttle body 3 which accommodates a main throttle valve and a sub throttle valve mounted in the main intake pipe and the sub intake pipe, respectively, for synchronous operation. Neither of the two throttle valves is shown. A throttle valve opening sensor 4 is connected to the main throttle valve for detecting its valve opening and converting same into an electrical signal which is supplied to an electronic control unit (hereinafter called "ECU") 5.

A fuel injection device 6 is arranged in the intake pipe 2 at a location between the engine 1 and the throttle body 3, which comprises main injectors and a subinjector, all formed by electromagnetically operated fuel injection valves, none of which is shown in FIG. 1. The main injectors correspond in number to the engine cylinders and are each arranged in the main intake pipe at a location slightly upstream of an intake valve, not shown, of a corresponding engine cylinder, while the subinjector, which is single in number, is arranged in the sub intake pipe at a location slightly downstream of the sub throttle valve, for supplying fuel to all the engine cylinders. The fuel injection device 6 is connected to a fuel pump, not shown. The main injectors and the subinjector are electrically connected to the ECU 5 in a manner having their valve opening periods or fuel injection quantities controlled by driving signals supplied from the ECU 5.

On the other hand, an absolute pressure sensor 8 communicates through a conduit 7 with the interior of the main intake pipe at a location immediately downstream of the main throttle valve of the throttle body 3. The absolute pressure sensor 8 is adapted to detect absolute pressure in the intake pipe 2 and apply an electrical signal indicative of detected absolute pressure to the ECU 5. An intake air temperature sensor 9 is arranged in the intake pipe 2 at a location downstream of the absolute pressure sensor 8 and also electrically connected to the ECU 5 for supplying thereto an electrical signal indicative of detected intake air temperature.

An engine temperature sensor 10, which may be formed of a thermistor or the like, is mounted on the main body of the engine 1 in a manner embedded in the peripheral wall of an engine cylinder having its interior filled with cooling water, an electrical output signal of which is supplied to the ECU 5.

An engine rpm sensor (hereinafter called "Ne sensor") 11 and a cylinder-discriminating sensor 12 are arranged in facing relation to a camshaft, not shown, of the engine 1 or a crankshaft of same, not shown. The former 11 is adapted to generate one pulse at a particular crank angle each time the engine crankshaft rotates through 180 degrees, i.e., a pulse of the top-dead-center position (TDC) signal, while the latter is adapted to generate one pulse at a particular crank angle of a particular engine cylinder. The above pulses generated by the sensors 11, 12 are supplied to the ECU 5.

A three-way catalyst 14 is arranged in an exhaust pipe 13 extending from the main body of the engine 1 for purifying ingredients HC, CO and NOx contained in the exhaust gases. An $O_2$ sensor 15 is inserted in the exhaust pipe 13 at a location upstream of the three-way catalyst 14 for detecting the concentration of oxygen in the exhaust gases and supplying an electrical signal indicative of a detected concentration value to the ECU 5.

Further connected to the ECU 5 are a sensor 16 for detecting atmospheric pressure and a starting switch 17 of the engine, respectively, for supplying an electrical signal indicative of detected atmospheric pressure and an electrical signal indicative of its own on and off positions to the ECU 5.

An exhaust gas recirculating passageway 18 is provided which connects the exhaust pipe 13 to the intake pipe 2, and across which is mounted an exhaust gas recirculation valve 19. This valve 19 is a negative pressure-actuated type and comprises a valve body 19a arranged for opening and closing the passageway 18, a diaphragm 19b coupled to the valve body 19a by means of a valve rod 19e and actuatable by atmospheric pressure or negative pressure which is selectively applied thereto by means of EGR control valves 21 and 22, hereinafter referred to, and a spring 19c urging the diaphragm 19b in the valve closing direction. A negative pressure chamber 19d is defined by the diaphragm 19b, which is connected to a communication passageway 20 for introducing absolute pressure in the intake pipe 2 by way of the EGR control valve 22 which is a normally closed type and arranged across the communication passageway 20. An atmospheric pressure-intake passageway 23 is joined to the communication passageway 20 at a location downstream of the EGR control valve 22 so that atmospheric pressure is introduced into the communication passageway 20 by way of the EGR control valve 21 which is a normally open type and which is arranged across the communication passageway 23, and then guided into the negative pressure chamber 19d. The EGR control valves 21 and 22 are both electrically connected to the ECU 5 for operation in unison with each other or alone in response to control signals from the ECU 5 to control the lifting motion of the valve body 19a of the exhaust gas recirculation valve 19 and the moving speed thereof.

A lift sensor 24, which may be formed of a potentiometer, is mounted on the exhaust gas recirculation valve 19 for detecting the operating position of the valve body 19a of the valve 19 and supplying an electrical signal indicative of its detected operating position of the valve body to the ECU 5.

Next, details of the manner of fuel quantity control of the fuel supply control system outlined above will now be described with reference to FIG. 1 referred to above as well as FIGS. 2 through 12.

Figure 2:
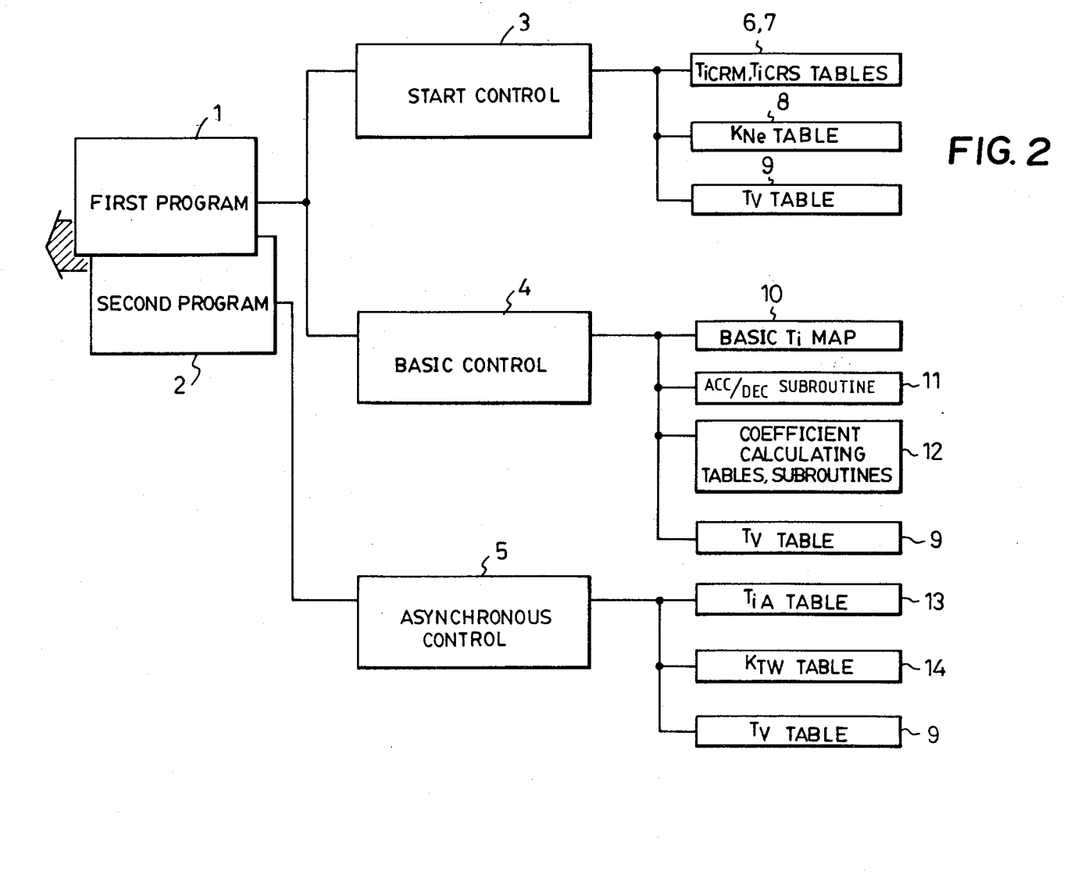
FIG. 2 is a block diagram showing a program for control of the valve opening periods TOUTM and TOUTS of the main injectors and the subinjector, which is executed by the electronic control unit (ECU) in FIG. 1.

FIG. 2 shows a block diagram showing the whole program for air/fuel ratio control, i.e., control of the valve opening periods TOUTM and TOUTS of the main injectors and the subinjector, which is executed by the ECU 5. The program comprises a first program 1 and a second program 2. The first program 1 is used for fuel quantity control in synchronism with the TDC signal, hereinafter merely called "synchronous control" unless otherwise specified, and comprises a start control subroutine 3 and a basic control subroutine 4, while the second program 2 comprises an asynchronous control subroutine 5 which is carried out in asynchronism with or independently of the TDC signal.

In the start control subroutine 3, the valve opening periods TOUTM and TOUTS are determined by the following basic equations:

$$TOUTM = TiCRM \times KNe + (TV + \Delta TV) \qquad (1)$$

$$TOUTS = TiCRS \times KNe + TV \qquad (2)$$

where TiCRM and TiCRS represent basic values of the valve opening periods for the main injectors and the subinjector, respectively, which are determined from a TiCRM table 6 and a TiCRS table 7, respectively, KNe represents a correction coefficient applicable at the start of the engine, which is variable as a function of engine rpm Ne and determined from a KNe table 8, and TV represents a constant for increasing and decreasing the valve opening period in response to changes in the output voltage of the battery, which is determined from a TV table 9. A $\Delta TV$ is added to TV applicable to the main injectors as distinct from TV applicable to the subinjector, because the main injectors are structurally different from the subinjector and therefore have different operating characteristics.

The basic equations for determining the values of TOUTM and TOUTS applicable to the basic control subroutine 4 are as follows:

$$\begin{aligned}TOUTM = &(TiM - TDEC) \times (KTA \times KTW- \\ &\times KAFC \times KPA \times KAST \times KWOT \times KO_2 \times KLS) \\ &+ TACC \times (KTA \times KTWT \times KAFC \times KPA \times \\ &KAST) + (TV + \Delta TV)\end{aligned} \qquad (3)$$

$$TOUTS = (TiS - TDEC) \times (KTA \times KTW- \\ \times KAST \times KPA) + TV \qquad (4)$$

where TiM and TiS represent basic values of the valve opening periods for the main injectors and the subinjector, respectively, and can be determined from a basic Ti map 10, and TDEC and TACC represent constants applicable, respectively, at engine deceleration and at engine acceleration and are determined by acceleration and deceleration subroutines 11. The coefficients KTA, KTW, etc. are determined by their respective tables and/or subroutines 12. KTA is an intake air temperature-dependent correction coefficient and is determined from a table as a function of actual intake air temperature, KTW a fuel increasing coefficient which is determined from a table as a function of actual engine cooling water temperature TW, KAFC a fuel increasing coefficient applicable after fuel cut operation and determined by a subroutine, KPA an atmospheric pressure-dependent correction coefficient determined from a table as a function of actual atmospheric pressure, and KAST a fuel increasing coefficient applicable after the start of the engine and determined by a subroutine. KWOT is a coefficient for enriching the air/fuel mixture, which is applicable at wide-open-throttle and has a constant value, $KO_2$ an "$O_2$ feedback control" correction coefficient determined by a subroutine as a function of actual oxygen concentration in the exhaust gases, and KLS a mixture-leaning coefficient applicable at "lean stoich." operation and having a constant value. The term "stoich." is an abbreviation of a word "stoichiometric" and means a stoichiometric or theoretical air/fuel ratio of the mixture.

On the other hand, the valve opening period TMA for the main injectors which is applicable in asynchronism with the TDC signal is determined by the following equation:

$$TMA = TiA \times KTWT \times KAST + (TV + \Delta TV) \qquad (5)$$

where TiA represents a TDC signal-asynchronous fuel increasing basic value applicable at engine acceleration and in asynchronism with the TDC signal. This TiA value is determined from a TiA table 13. KTWT is defined as a fuel increasing coefficient applicable at and after TDC signal-synchronous acceleration control as well as at TDC signal-asynchronous acceleration control, and is calculated from a value of the aforementioned water temperature-dependent fuel increasing coefficient KTW obtained from the table 14.

Figure 3:
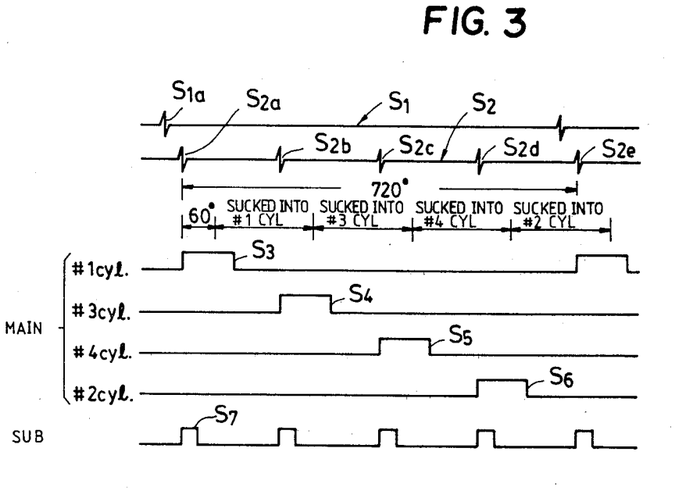
FIG. 3 is a timing chart showing the relationship between a cylinder-discriminating signal and a TDC signal, both inputted to the ECU and driving signals for the main injectors and the subinjector, outputted from the ECU.

FIG. 3 is a timing chart showing the relationship between the cylinder-discriminating signal and the TDC signal, both inputted to the ECU 5, and the driving signals outputted from the ECU 5 for driving the main injectors and the subinjector. The cylinder-discriminating signal $S_1$ is inputted to the ECU 5 in the form of a pulse $S_1$ a each time the engine crankshaft rotates through 720 degrees. Pulses $S_2a$–$S_2e$ forming the TDC signal $S_2$ are each inputted to the ECU 5 each time the engine crankshaft rotates through 180 degrees. The relationship in timing between the two signals $S_1$, $S_2$ determines the output timing of driving signals $S_3$–$S_6$ for driving the main injectors of the four engine cylinders. More specifically, the driving signal $S_3$ is outputted for driving the main injector of the first engine cylinder, concurrently with the first TDC signal pulse $S_2a$, the driving signal $S_4$ for the third engine cylinder concurrently with the second TDC signal pulse $S_2b$, the driving signal $S_5$ for the fourth cylinder concurrently with the third pulse $S_2c$, and the driving signal $S_6$ for the second cylinder concurrently with the fourth pulse $S_2d$, respectively. The subinjector driving signal $S_7$ is generated in the form of a pulse upon application of each pulse of the TDC signal to the ECU 5, that is, each time the crankshaft rotates through 180 degrees. It is so arranged that the pulses $S_2a$, $S_2b$, etc. of the TDC signal are each generated earlier by 60 degrees than the time when the piston in an associated engine cylinder reaches its top dead center, so as to compensate for arithmetic operation lag in the ECU 5, and a time lag between the formation of a mixture and the suction of the mixture into the engine cylinder, which depends upon the opening action of the intake pipe before the piston reaches its top dead center and the operation of the associated injector.

Figures 4, 4A:
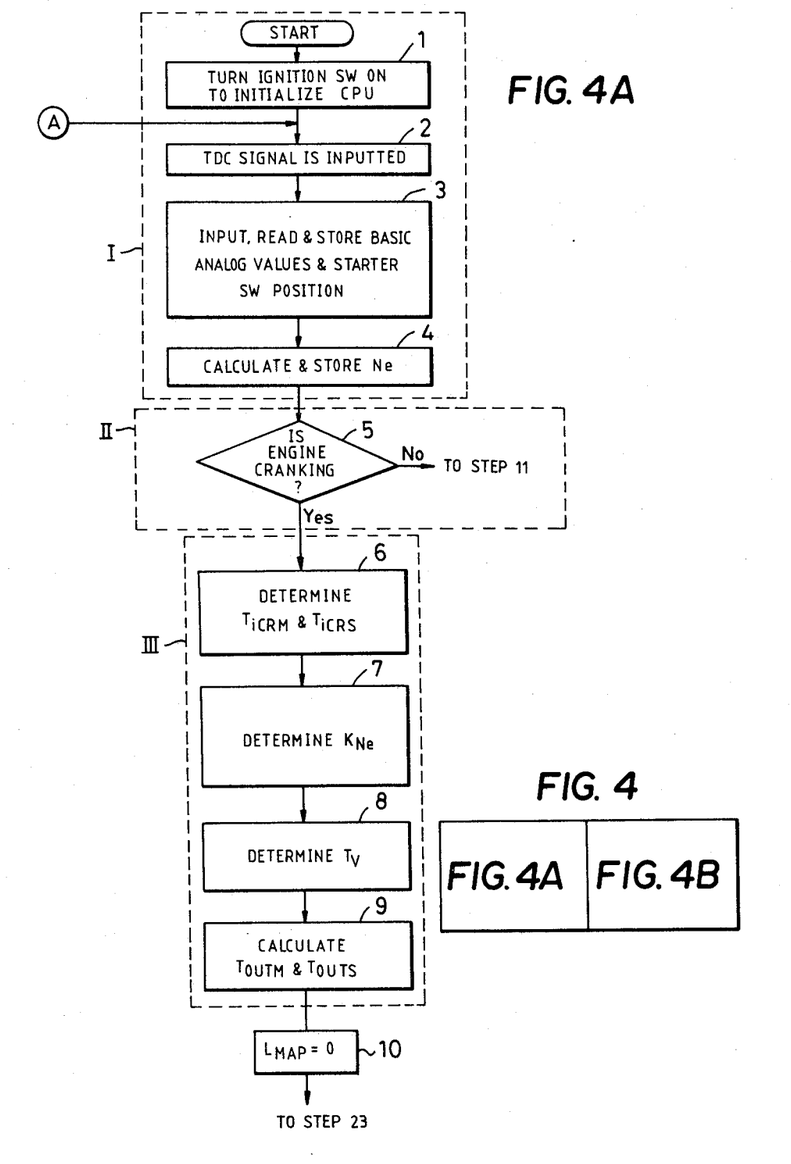
FIGS. 4, 4A, and 4B are a flow chart showing a main program for control of the fuel supply, inclusive of control of the exhaust gas recirculation.
Figure 4B:
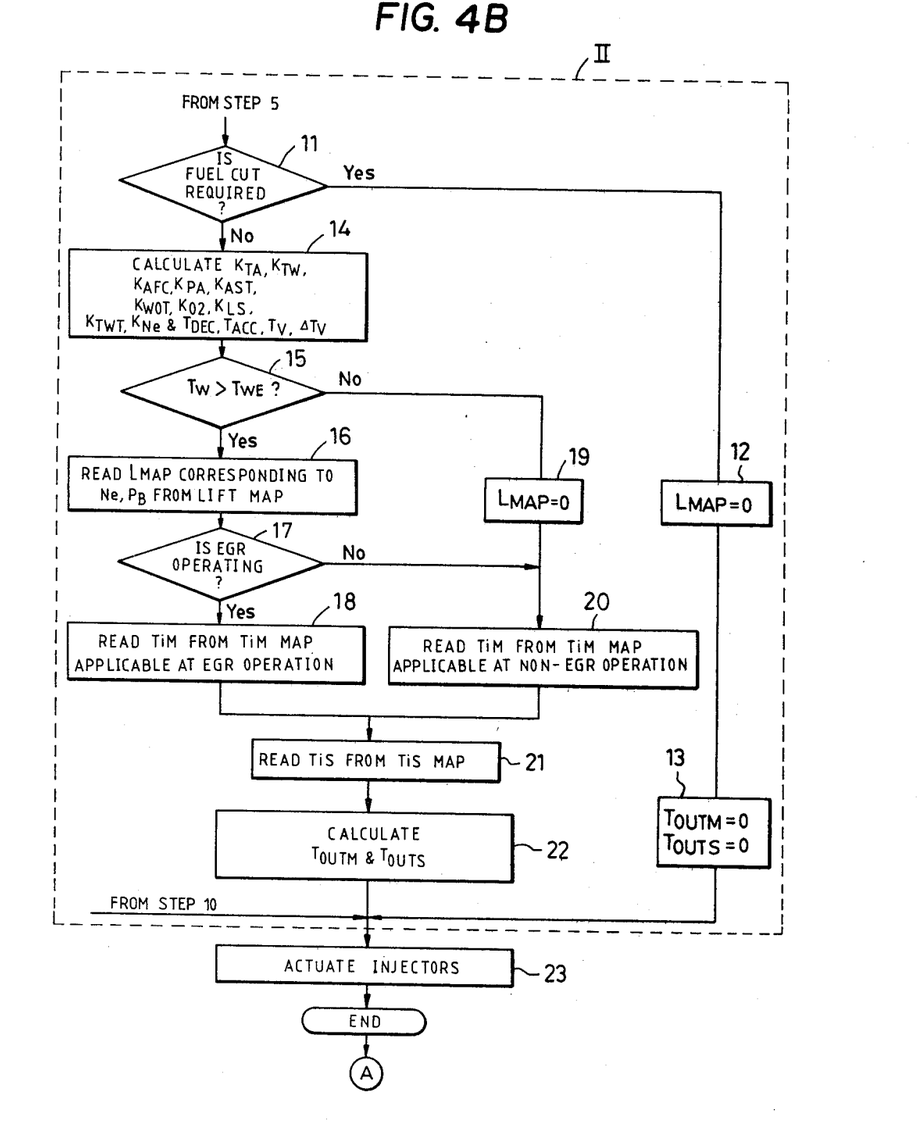

Referring next to FIG. 4, there is shown a flow chart of the aforementioned first program 1 for control of the valve opening period in synchronism with the TDC signal in the ECU 5. The whole program comprises an input signal processing block I, a basic control block II and a start control block III. First in the input signal processing block I, when the ignition switch of the engine is turned on, a CPU in the ECU 5 is initialized at the step 1 and the TDC signal is inputted to the ECU 5 as the engine starts at the step 2. Then, all basic analog values are inputted to the ECU 5, which include detected values of atmospheric pressure PA, absolute pressure PB, engine cooling water temperature TW, atmospheric air temperature TA, valve lift L of the exhaust gas recirculating valve 19, throttle valve opening $\theta$th, battery voltage V, output voltage value V of the $O_2$ sensor and on-off state of the starting switch 17, some necessary ones of which are then stored therein (step 3). Further, the period between a pulse of the TDC signal and the next pulse of same is counted to calculate actual engine rpm Ne on the basis of the counted value, and the calculated value is stored in the ECU 5 (step 4). The program then proceeds to the basic control block II. In this block, a determination is made, using the calculated Ne value, as to whether or not the engine rpm is smaller than the cranking rpm (starting rpm) at the step 5. If the answer is affirmative, the program proceeds to the start control of the start control block subroutine III. In this block, values of TiCRM and TiCRS are selected from a TiCRM table and a TiCRS table, respectively, on the basis of the detected value of engine cooling water temperature TW (step 6). Also, the value of Ne-dependent correction coefficient KNe is determined by using the KNe table (step 7). Further, the value of battery voltage-dependent correction constant TV is determined by using the TV table (step 8). These determined values are applied to the aforementioned equations (1), (2) to calculate the values of TOUTM and TOUTS (step 9).

Figure 5:
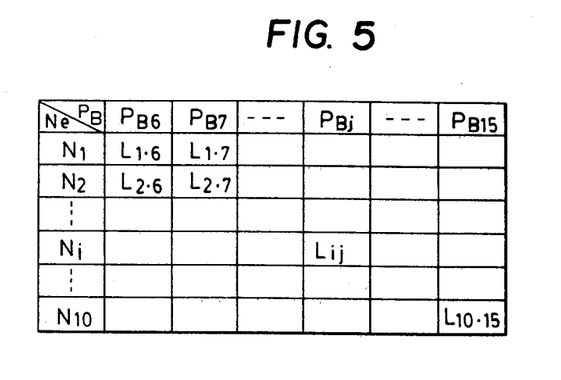
FIG. 5 is a view showing a map of the valve lift command values LMAP for the exhaust gas recirculation valve.

During the start control subroutine III described above, a valve lift command value LMAP which indicates zero lift is selected at the step 10, to set the valve body lift of the exhaust gas recirculation valve 19 to zero. FIG. 5 shows a map of the lift command value LMAP, where ten steps of different predetermined values PB6–15 of the absolute pressure PB are provided which are set within a range of 204–780 mmHg for instance, and ten steps of different predetermined values N1-10 of the engine rpm Ne set within a range of 0–4000 rpm for instance. Lift command values LMAP are determined by means of interpolation, if actual values of the absolute pressure PB and/or the engine rpm Ne fall between the predetermined values or outside the range or ranges.

If the answer to the question of the above step 5 is no, it is determined whether or not the engine is in a condition for carrying out fuel cut, at the step 11. If the answer is yes, a lift command value LMAP is selected which indicates zero lift, at the step 12, and simultaneously the values of TOUTM and TOUTS are set to zero, at the step 13.

On the other hand, if the answer to the question of the step 11 is negative, calculations are carried out of values of correction coefficients KTA, KTW, KAFC, KPA, KAST, KWOT, $KO_2$, KLS, KTWT, etc. and values of correction constants TDEC, TACC, TV and $\Delta$TV, by means of the respective calculation subroutines and tables, at the step 14.

Then, a comparison is made of whether or not actual engine cooling water temperature TW is higher than a predetermined value TWE for carrying out the exhaust gas recirculating operation, at the step 15. If it is found that the former is higher than the latter, a lift command value LMAP is selected from the lift command value map, which corresponds to actual engine rpm Ne and actual intake pipe absolute pressure PB, at the step 16. The selected lift command value LMAP is compared with the actual valve lift LACT of the exhaust gas recirculation valve 19 in FIG. 1, and both or one of SOL. A 21 and SOL. B 22 in FIG. 1 is actuated in response to the difference between the values LMAP and LACT for correction of the valve lift, so as to obtain a required valve opening. Then, it is determined whether or not the exhaust gas recirculation valve 19 is operating, at the step 17. The engine operation where the valve 19 is operating will be referred to as "EGR operation" hereinafter, and that where it is at rest as "non-EGR operation", respectively. If the answer to the question of the step 17 is yes, a basic valve opening period value TiM is selected from a TiM map applicable during EGR operation, which corresponds to actual engine rpm Ne and actual absolute pressure PB, at the step 18. If the answer is negative at the step 17, another basic valve opening value TiM is selected from another map of the TiM value applicable during non-EGR operation, which corresponds to actual engine rpm Ne and actual absolute pressure PB, at the step 20.

On the other hand, if the determination at the step 15 gives a negative answer, a lift command value LMAP indicative of zero lift is selected at the step 19, while simultaneously a basic value TiM is selected from the non-EGR operation TiM map, which corresponds to actual engine rpm Ne and actual absolute pressure PB, at the step 20. The EGR operation, if carried out when the engine cooling water temperature TW is low, can make the combustion in the engine cylinders unstable, resulting in degraded driveability. Therefore, the EGR operation is not carried out when the cooling water temperature TW is below the predetermined value TWE.

Following the above selection of the basic value TiM, a basic valve opening period value TiS is selected from a map of the TiS value, which corresponds to actual engine rpm Ne and actual absolute pressure PB, at the step 21.

Then, calculations are carried out of the values TOUTM, TOUTS on the basis of the values of correction coefficients and correction constants selected as described above, using the aforementioned equation (3), (4) (step 22). The main injectors and the subinjector are actuated with valve opening periods corresponding to the values of TOUTM, TOUTS obtained by the aforementioned steps 9, 13 and 22 (step 23).

A TiM value applicable during EGR operation, a TiM value applicable during non-EGR operation and a TiS value are selected which correspond to actual engine rpm Ne and actual absolute pressure PB, at the steps 18, 20 and 21, respectively. Practically, Ne-PB maps, not shown, are used which are similar to the lift command value LMAP map shown in FIG. 5 and in which several predetermined values of engine rpm Ne and absolute pressure PB are provided as parameters. The above TiM values and the TiS value are read from their respective maps, as corresponding to the above predetermined Ne and PB values. Also, interpolation is applied for determining the TiM values and the TiS value if an actual Ne or PB value falls between the predetermined Ne or PB values or outside their ranges.

As previously stated, in addition to the above-described control of the valve opening periods of the main injectors and the subinjector in synchronism with the TDC signal, asynchronous control of the valve opening periods of the main injectors is carried out in a manner asynchronous with the TDC signal but synchronous with a certain pulse signal having a constant pulse repetition period, detailed description of which is omitted here.

As previously stated by referring to FIG. 4, according to the main program shown in FIG. 4 for control of the exhaust gas recirculation and the valve opening period of the fuel injection valves, the exhaust gas recirculation quantity is determined as a function of the engine water temperature TW, the engine rpm Ne and the intake pipe absolute pressure PB and at the same time, the fuel supply quantity is determined as a function of engine rpm Ne and absolute pressure PB by the use of two different TiM maps selected depending upon whether the engine is during EGR operation or during non-EGR operation. This control manner enables to perform highly accurate control of the air/fuel ratio, leading to improvements in the fuel consumption, emission characteristics and driveability of the engine.

However, the valve lifting action of the exhaust gas recirculation valve which is responsive to the lift command value LMAP signal has some response lag or time delay. As a consequence, if a quantity of fuel corresponding to a value LMAP of the lift command signal is supplied to the engine immediately upon outputting or reading of the same LMAP value, this will result in an air/fuel ratio inappropriate to the operating condition of the engine, because the exhaust gas recirculation amount does not yet reach a value exactly corresponding to the read LMAP value at the instant of the reading of the same value.

Figure 6:
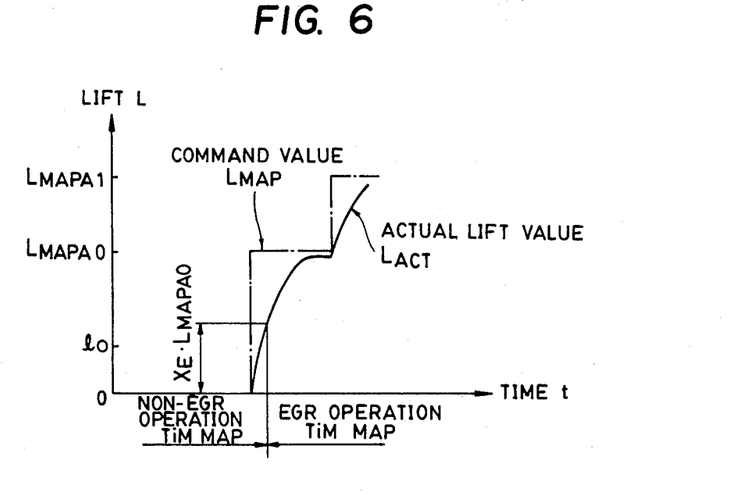
FIG. 6 is a graph showing a change in the actual valve opening LACT occurring when the valve lift command value changes from 0 to a larger value.
Figure 7:
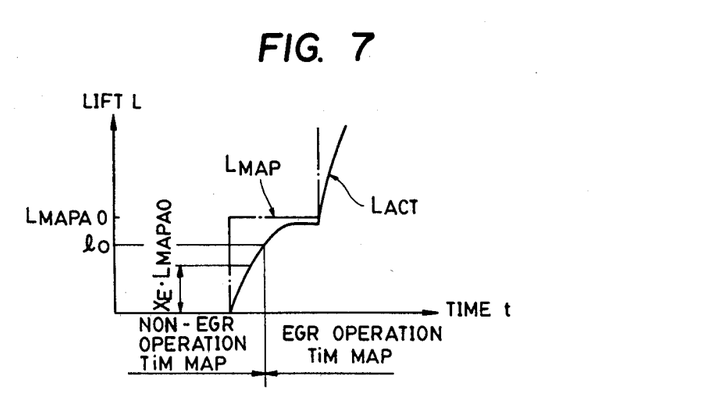
FIG. 7 is a graph similar to FIG. 6, applicable when a value XE·LMAPA0 is smaller than an insensitive zone defining value $l_0$.

FIGS. 6 and 7 show changes in the actual valve lift LACT occurring upon reading of an LMAP value LMAPA0 indicative of a value larger than 0 at the time when an LMAP value so far outputted is indicative of zero lift, and also shows the manner of selecting basic injection period TiM maps. In the event that the LMAP value LMAPA0 indicative of a value larger than 0 is read, following the LMAP value indicative of zero lift, if the ECU regards that the EGR operation should immediately be effected and selects the TiM map applicable during EGR operation at the instant of the reading of the value LMAPA0, a quantity of fuel applicable during EGR operation is supplied to the engine even before the actual recirculation quantity does not virtually reach the quantity corresponding to the value LMAPA0, resulting in an inappropriate air/fuel ratio. To avoid the above inconvenience, according to the invention, as shown in FIG. 6, the actual valve lift LACT is compared with a value XE·LMAPA0 obtained by multiplying the value LMAPA0 by a predetermined coefficient XE having a value smaller than 1. And, only after the actual value LACT has exceeded the value XE·LMAPA0, the TiM map applicable during EGR operation is selected, thus making it possible to achieve the air/fuel ratio control with high accuracy.

If the value LMAPA0 has a small value, the value XE·LMAPA0 can be smaller than an insensitive zone defining value $l_0$ equivalent to the tolerance of the valve lift of the exhaust gas recirculation valve. This insensitive zone defining value $l_0$ is such a value that if the error 1 of the actual lift of the exhaust gas recirculation valve with respect to a desired value (lift command value LMAP) is within a range defined by the insensitive zone defining value $l_0$, i.e. the relationship of $1 < l_0$ stands, the actual lift LACT can be regarded as equal to the lift command value LMAP. In such event, according to the invention, the TiM map applicable during EGR operation is not selected until after the actual lift LACT has become larger the insensitive zone defining value $l_0$.

Figure 8:
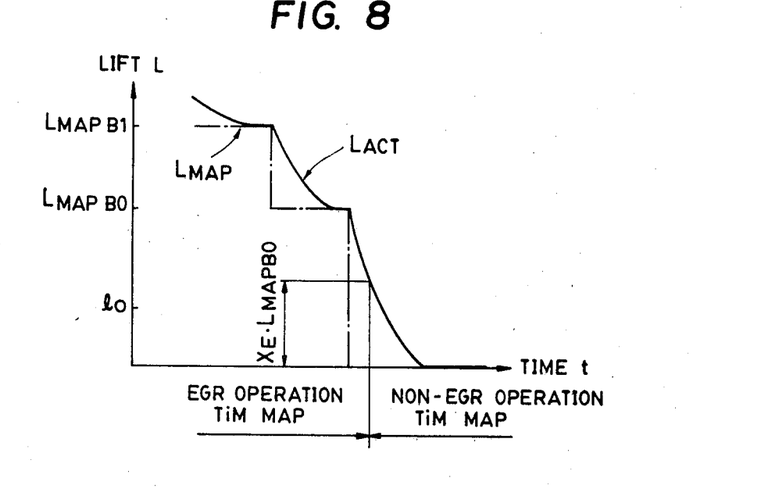
FIG. 8 is a graph showing a change in the actual valve opening LACT occurring when the valve lift command changes from a value larger than 0 to 0.
Figure 9:
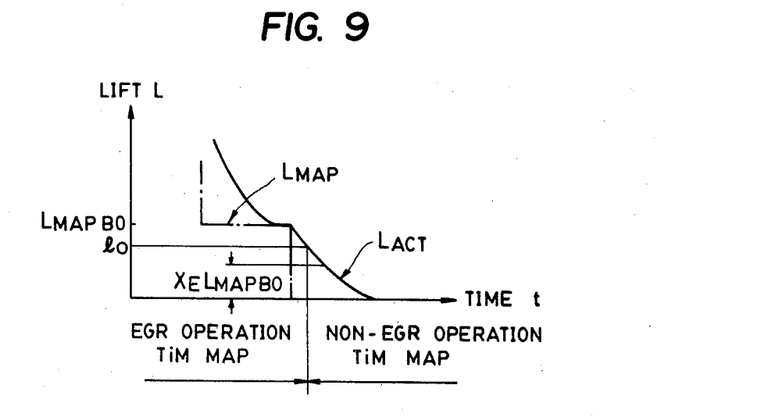
FIG. 9 is a graph similar to FIG. 8, applicable when a value XE·LMAPB0 is smaller than the insensitive zone defining value $l_0$.

FIGS. 8 and 9 show changes in the actual valve lift LACT occurring upon reading of a LMAP value indicative of zero lift when a LMAP value indicative of a value larger than 0 is outputted, as well as the manner of selecting basic injection period TiM maps. In the event that a lift command value LMAP indicative of a value of 0 is issued at the time when an LMAP value so far outputted has a value LMAPB0, if the ECU regards that the EGR operation should immediately be interrupted and selects the TiM map applicable during non-EGR operation, immediately upon issue of the LMAP value of 0, a quantity of fuel applicable during non-EGR operation is supplied to the engine even before the exhaust gas recirculation valve becomes fully closed and the exhaust gas recirculation is interrupted, resulting in an inappropriate air/fuel ratio, as in the case described with reference to FIGS. 6 and 7. Therefore, according to the invention, in this event, as shown in FIG. 8, the actual valve lift LACT is compared with a value XE·LMAPB0 obtained by multiplying a lift command value LMAPB0 immediately preceding the LMAP value indicative of 0 is issued, by the predetermined coefficient XE. Only after the actual lift LACT has become smaller than the value XE·LMAPB0, the TiM map applicable during non-EGR operation is selected to ensure highly accurate control of the air/fuel ratio. When the value LMAPB0 has a small value, that is, the value XE·LMAPB0 is smaller than the insensitive zone defining value $l_0$ as shown in FIG. 9, the non-EGR operation TiM map is selected only after the actual lift LACT has dropped below the value $l_0$.

A time delay between issue of the valve lift command value LMAP and the actual valve lifting action of the exhaust gas recirculation valve can be compensated for by the above described manner of selection of the TiM maps, to ensure highly accurate control of the air/fuel ratio.

Figure 10:
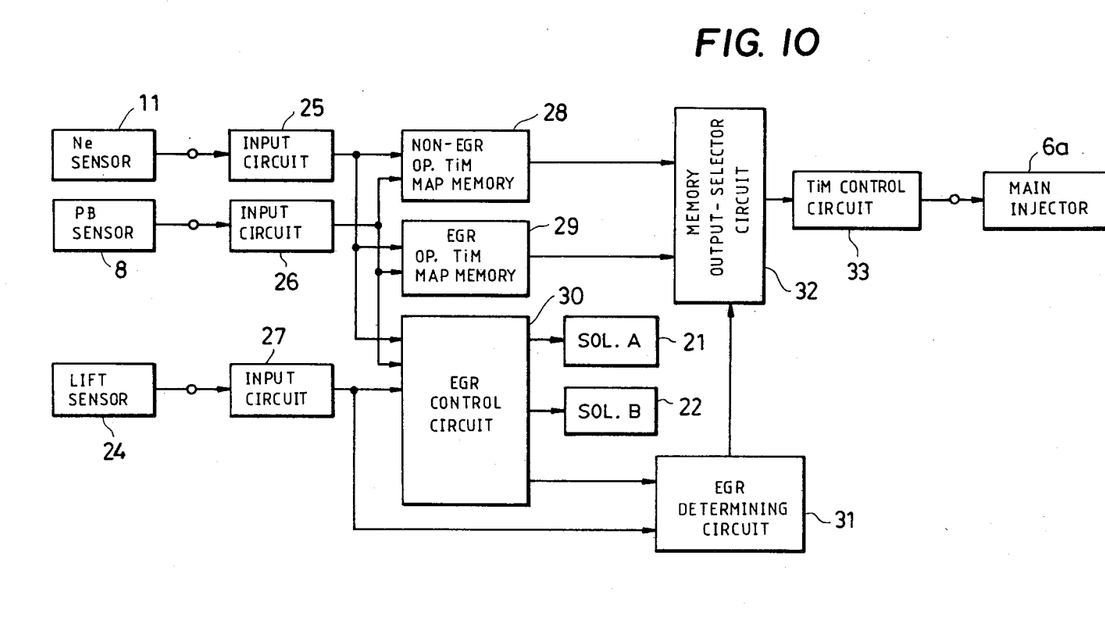
FIG. 10 is a block diagram illustrating a section in the ECU for control of the fuel injection and the exhaust gas recirculation.
Figure 11:
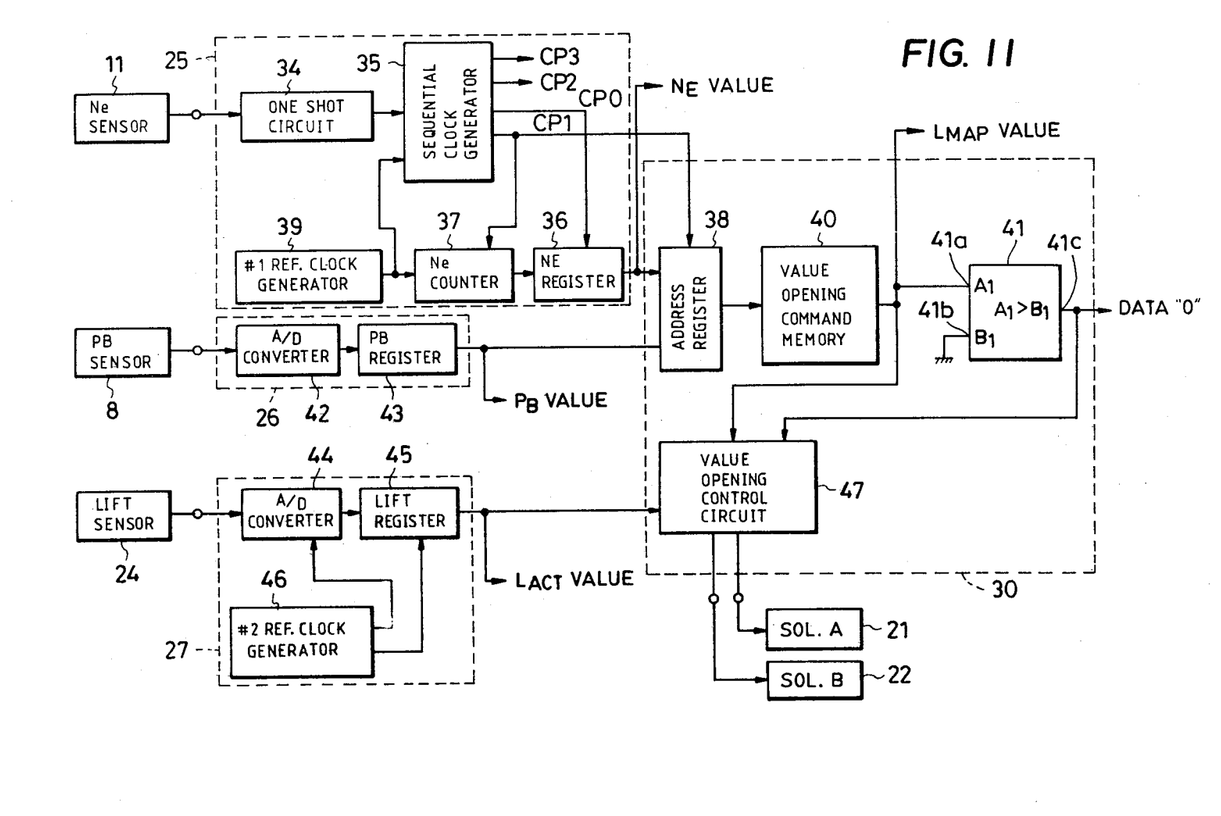
FIG. 11 is a block diagram illustrating the interior arrangements of the input circuits and the exhaust gas recirculation control circuit, all appearing in FIG. 10.
Figure 12:
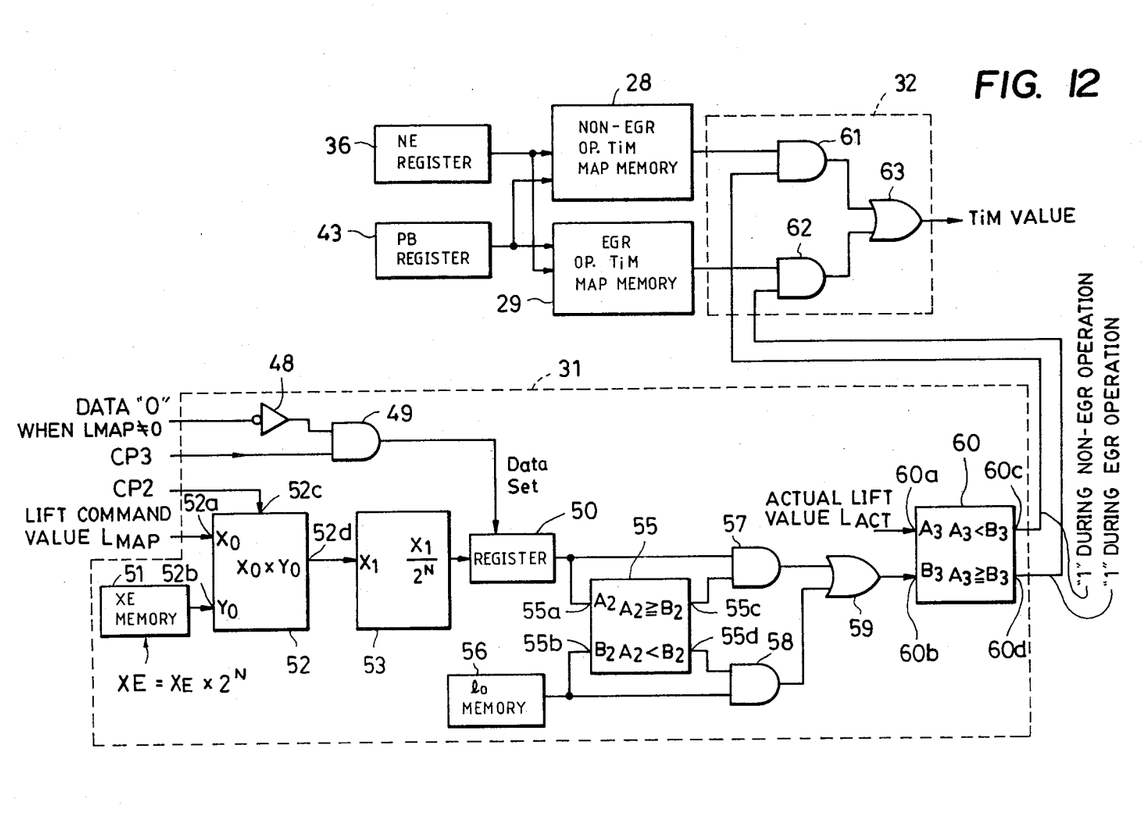
FIG. 12 is a circuit diagram illustrating details of the exhaust gas recirculating operation determining circuit and the memory output-selector circuit, both appearing in FIG. 10.

FIGS. 10 through 12 illustrate by way of example a control circuit provided in the ECU 5 for executing the exhaust gas recirculation control and the fuel injection period control according to the invention, which have been described above.

Referring first to FIG. 10, there is illustrated the whole arrangement of the control circuit in the ECU 5. The engine rpm Ne sensor 11 and the absolute pressure PB sensor 8, both appearing in FIG. 1, are arranged to supply their output signals to a non-EGR operation TiM map memory 28, an EGR operation TiM map memory 29 and an exhaust gas recirculation control circuit 30 through respective input circuits 25 and 26. The valve opening sensor 24, which is mounted on the exhaust gas recirculation valve 19 in FIG. 1, is arranged to supply its output signal indicative of the actual valve lift LACT to the exhaust gas recirculation circuit 30 and an exhaust gas recirculation determining circuit 31, through an input circuit 27. A basic injection period value TiM applicable during non-EGR operation is read from the non-EGR operation TiM map in the memory 28, and a basic injection period value TiM applicable during EGR operation from the EGR operation TiM map in the memory 29, respectively, which TiM values correspond to the input Ne and PB signals. The TiM values are supplied to a memory output-selector circuit 32. In the exhaust gas recirculation control circuit 30, a valve lift command value LMAP for the exhaust gas recirculation valve is read from the map stored therein and shown in FIG. 5, which corresponds to the input Ne and PB signals. The lift command value LMAP thus read is then compared with the actual valve lift value LACT in a valve opening control circuit 47 appearing in FIG. 11, hereinafter referred to, which is provided within the circuit 30. Depending upon the resulting difference between the values LMAP and LACT, both or one of SOL.A 21 and SOL.B 22 is actuated so as to make zero the difference, that is, to make the actual valve lift equal to the lift command value LMAP. The exhaust gas recirculation determining circuit 31 determined whether or not the EGR operation should be effected, depending upon the lift command value LMAP supplied from the exhaust gas recirculation control circuit 30 and the actual lift value LACT supplied from the input circuit 27, in the manners previously described with reference to FIGS. 6 through 8. The resulting output signal of the circuit 31 is applied to the memory output-selector circuit 32. The circuit 32 in turn is responsive to the input signal from the determining circuit 31 to selectively supply the TiM value applicable during EGR operation or one applicable during non-EGR operation to a TiM value control circuit 33. The TiM value control circuit 33 operates on the input TiM value to drive the main injectors 6a of the fuel injection device 6 for an injection period corresponding to the input TiM value.

FIG. 11 illustrates details of the input circuits 25, 26 and 27, and the exhaust gas recirculation control circuit 30, all appearing in FIG. 10. The engine rpm Ne sensor 11 is connected to a sequential clock generator 35 by way of a one shot circuit 34. The sequential clock generator 35 has a first output terminal connected to an NE value register 36, and a second output terminal to an Ne value counter 37 and an address register 38, respectively. A first reference clock generator 39 is connected to the inputs of the sequential clock generator 35 and the Ne value counter 37. The Ne value counter 37, the NE value register 36 and the address register 38 are serially connected in the order mentioned, with the output of the address register 38 connected to the input of a valve opening or lift command memory 40. The intake pipe absolute pressure PB sensor 8 in FIG. 1 is connected to the input of a PB value register 43 by way of an A/D converter 42, which register in turn has its output connected to the input of the above-mentioned address register 38. The valve opening command memory 40 has its output connected to an input terminal 41a of a comparator 41 as well as the input of the valve opening or lift control circuit 47. The EGR lift sensor 24 in FIG. 1 is connected to the input of a valve opening or lift value register 45 by way of an A/D converter 44, which register in turn has its output connected to the input of the valve opening control circuit 47. A second reference clock generator 46 is connected to the A/D converter 44 and the valve opening value register 45, for applying a start command signal to the former and a data set signal to the latter, respectively. The valve opening control circuit 47 has its output connected to the solenoids of SOL.A 21 and SOL.B 22.

A TDC signal from the engine rpm Ne sensor 11 is supplied to the one shot circuit 34 which forms a waveform shaping circuit in cooperation with the sequential clock generator 35 arranged adjacent thereto, and the one shot circuit 34 generates an output pulse S0 each time a TDC pulse is applied thereto. The output pulse S0 from the circuit 34 actuates the sequential clock generator 35 to sequentially generate a series of clock pulses CP0 through CP3 corresponding to input clock pulses from the first reference clock generator 39. The clock pulse CP0 is applied to the NE value register 36, and the clock pulse CP1 to the Ne value counter 37 and the address register 38, respectively. The clock pulses CP2 and CP3 are supplied to the exhaust gas recirculation determining circuit 31, as hereinlater described. Upon being supplied with each clock pulse CP1, the Ne value counter 37 starts counting pulses supplied from the first reference clock generator 39, and stores the number of pulses counted between two adjacent clock pulses CP1. The count stored in the Ne value counter 37 is loaded as a value NE into the Ne value register 36 upon application of each clock pulse CP0 to the register 36. Therefore, the value stored in the NE value register 36 is proportional to the reciprocal of the actual engine rpm Ne, since the pulse separation of the clock pulses CP1 becomes smaller as the engine rpm Ne increases.

An output signal indicative of intake pipe absolute pressure PB from the PB sensor 8 is converted into a corresponding digital value by the A/D converter 42, and loaded into the PB value register 43. Upon application of each clock pulse CP1 to the address register 38, the values stored in the NE value register 36 and the PB value register 43 are loaded into the address register 38, which in turn selects an address value corresponding to the actual engine rpm Ne and absolute pressure PB, and applies the read address value to the valve opening command memory 40 for selective reading of a corresponding command value LMAP therefrom. If the actual engine rpm Ne and absolute pressure PB correspond to a value intervening between two adjacent LMAP values in the memory 40 or to a value falling outside the predetermined range of the LMAP values, an appropriate LMAP value is calculated by an interpolation method by means of arithmetic means, not shown. The lift command value LMAP thus obtained is applied to the input terminal 41a of the comparator 41 as an input A1, and also to the valve opening control circuit 47. The comparator 41 has its other input terminal 41b grounded, that is, permanently supplied with an input value B1 of 0. When the lift command value LMAP has a value larger than 0, the input relationship of A1>B1 stands so that a low level output of 0 is generated through the output terminal 41c of the comparator 41, whereas when the LMAP value has a value of 0, i.e. the input relationship of A1=B1 stands, a high level output of 1 is generated through the output terminal 41c. The output of the comparator 41 is supplied to the valve opening control circuit 47 as well as the exhaust gas recirculation determining circuit 31 for operation hereinlater described.

An output signal indicative of actual valve lift from the lift sensor 24 mounted on the exhaust gas recirculation valve 19 is supplied to A/D converter 44, and converted into a corresponding digital value thereby upon application of each start command pulse thereto from the second reference clock generator 46, and the digital value is applied to the valve opening value register 45. The register 45 in turn has its old stored value replaced by a new value each time it is supplied with a data set pulse from the second reference clock generator 46, and the newly stored value is supplied to the valve opening control circuit 47.

The valve opening control circuit 47 compares an input lift command value LMAP with an actual lift value LACT supplied from the valve opening value register 45, and responsive to the difference thus obtained, it actuates both or one of SOL.A 21 and SOL.B 22 through energization to control the pressure in the negative pressure chamber 19d in FIG. 1, by an amount corresponding to the absolute value of the above difference and in a direction corresponding to the value of the same difference relative to zero, until the above difference becomes zero, that is, the actual valve lift becomes equal to the lift command value LMAP.

The exhaust gas recirculation determining circuit 31 and the memory output-selector circuit 32 are illustrated in detail in FIG. 12. An inverter 48 incorporated in the exhaust gas recirculation determining circuit 31 has its input connected to the output terminal 41c of the comparator 41 in FIG. 11, and its output to the input of a register 50 by way of an AND circuit 49. The AND circuit 49 has its input also connected to the sequential clock generator 35 in FIG. 11 to be supplied with clock pulses CP3 therefrom. A multiplier 52 has an input terminal 52a connected to the output of the valve opening command memory 40 in FIG. 11 to be supplied with read lift command values LMAP therefrom. The multiplier 52 has an input terminal 52b connected to an XE value memory 51 and another input terminal 52c connected to the sequential clock generator 35 in FIG. 11 to be supplied with clock pulses CP2 therefrom. The multiplier 52 has its output terminal 52d connected to the input of the register 50 by way of an divider 53. The register 50 has its output connected to an input terminal of an AND circuit 57 as well as an input terminal 55a of a comparator 55. An $l_0$ value memory 56 has its output connected to the input terminal 55b of the comparator 55 and an input terminal of an AND circuit 58. The AND circuit 57 has its other input terminal connected to the output terminal 55c of the comparator 55, and its output to the input of an OR circuit 59, respectively. The AND circuit 58 has its other input terminal connected to the output terminal 55d of the comparator 55, and its output terminal to the input of the OR circuit 59, respectively. The OR circuit 59 has its output connected to an input terminal 60b of a comparator 60, which in turn has its other input terminal connected to the output of the valve opening value register 45 in FIG. 11 to be supplied with actual lift values LACT therefrom. The comparator 60 has its two output terminals 60c and 60d connected, respectively, to input terminals of AND circuits 61 and 62, both incorporated in the memory output-selector circuit 32. The AND circuit 61 has its other input terminal connected to the output of the non-EGR operation TiM map memory 28 appearing in FIG. 10, and the AND circuit 62 has its other input terminal to the output of the EGR operation TiM map memory 29, respectively. The AND circuits 61 and 62 have their outputs connected to the input of an OR circuit 63, which in turn has its output connected to the input of the TiM value control circuit 33 in FIG. 10.

The exhaust gas recirculation determining circuit 31 and the memory output-selector circuit 32 constructed above operate as follows: The multiplier 52 has its input terminal 52a supplied with a lift command value LMAP as an input X0, and its other input terminal 52b with a value XE from the XE value memory 51 as an input Y0, respectively. Upon application of each clock pulse CP2 to the input terminal 52c of the multiplier 52, a product value X0×Y0 is generated from the multiplier 52 through its output terminal 52d and applied to the divider 53 as an input X1. For the convenience of multiplication at the multiplier 52, the value XE is stored in the memory 51 in the form of an integral value obtained by multiplying an actual coefficient value XE (0<XE<1) by $2^N$. Therefore, a calculation of $X_1/2^N$ is effected at the divider 53 to obtain a proper value XE·LMAP. The quotient value $X_1/2^N$ or XE·LMAP is applied to the register 50. The register 50 has its old stored value replaced by a new value XE·LMAP upon application of each clock pulse CP3 thereto, and applies the newly stored value to the input terminal 55a of the comparator 55 as an input A2, as well as the AND circuit 57. Each clock pulse CP3, which is applied to the register 50 through the AND circuit 49, is not applied to the register 50 as long as a low level output of 0 is applied to the input of the AND circuit 49. That is, when the input relationship of A1=B1 stands in the comparator 41 in FIG. 11, that is, the read lift command value LMAP is equal to 0, the output of 1 as a data signal is inverted into a low level of 0 by the inverter 48, and applied to the AND circuit 49. The timing of inversion of the data signal from "0" to "1" or "1" to "0" is the same with the timing of a value LMAP being read from the valve opening or lift command value memory 40 upon application of each clock pulse CP1 to the address register 38 in FIG. 11. Let it now be assumed that the lift command value LMAP has its value changed from 0 to the value LMAPA0 as shown in FIG. 6. On this occasion, the input to the AND circuit 49 turns from "0" to "1" upon generation of a clock pulse CP1, to open the same circuit 49. Then, upon generation of a CP2 immediately following the CP1, a calculation of XE×LMAPA0 is effected at the multiplier 52 and the divider 53, and the resultant product value XE·LMAPA0 is applied to the register 50. The register has its stored value of 0 replaced by the new value XE·LMAPA0 upon application of a clock pulse CP3 immediately following the clock pulse CP2, and the new value XE·LMAPA0 is supplied to the comparator 55. Next, let us study about an assumption of a change of the LMAP value from the value LMAPB0 to 0 as shown in FIG. 8, the input to the AND circuit 49 changes from "1" to "0" upon generation of a clock pulse CP1, to close the AND circuit 49. After this, subsequent clock pulses CP3 are not supplied to the register 50 even with application of the subsequent clock pulses CP3 to the AND circuit 49. Therefore, even after a value XE·LMAP (=0) has been applied to the register 50 upon generation of the preceding clock pulse CP2, the stored value XE·LMAPB0 loaded in the previous loop remains stored in the register 50, and is continuously applied to the input terminal 55a of the comparator 55.

In the comparator 55, a value XE·LMAP inputted through the input terminal 55a as an input A2 is compared with the aforementioned insensitive zone defining value $l_0$ inputted through the input terminal 55b as an input B2. When the input relationship of A2≧B2 stands, that is, the input value XE·LMAP is larger than or equal to $l_0$, an output of 1 is generated through the output terminal 55c and applied to the AND circuit 57 to open same so that the stored value XE·LMAP from the register 50 is allowed to pass through the AND circuit 57 and the OR circuit 59 and applied to the input terminal 60b of the comparator 60 as an input B3. On the other hand, since on this occasion the input relationship of A2<B2 does not stand at the comparator 55, an output of 0 is generated through the output terminal 55d and applied to the AND circuit 58 to close same.

In the comparator 60, the actual valve lift value LACT inputted through the input terminal 60a as an input A3 is compared with the aforementioned value XE·LMAP inputted through the input terminal 60b as an input B3. When the input relationship of A3<B3 or LACT<XE·LMAP stands, an output of 1 is generated through the output terminal 60c and another output of 0 through the other output terminal 60d, respectively, and these outputs are applied, respectively, to the AND circuits 61 and 62 to open the circuit 61 and close the circuit 62. Then, a basic injection period value TiM stored in the non-EGR operation TiM map memory 28 is delivered through the opened AND circuit 61 and the OR circuit 63 to the TiM value control circuit 33 in FIG. 10. Next, when the input relationship of A3≧B3 or LACT≧XE·LMAP stands, an output 0 is generated from the comparator 60 through the output terminal 60c, and simultaneously an output of 1 through the other output terminal 60d, respectively, and applied, respectively, to the AND circuit 61 and the AND circuit 62, to close the former and open the latter. Then, a basic injection period value TiM from the EGR operation TiM map memory 29 is supplied through the opened AND circuit 62 and the OR circuit 63 to the TiM value control circuit 33.

When the input relationship of A2<B2 or XE·LMAP<$l_0$ stands at the comparator 55, an output of 0 is generated through the output terminal 55c and an output of 1 through the other output terminal 55d, respectively, and applied, respectively, to the AND circuit 57 and the AND circuit 58, to close the former and open the latter so that the value $l_0$ from the $l_0$ value memory 56 is fed through the second AND circuit 58 and the OR circuit 59 to the comparator 60 as an input B3. Thereafter, in the same manner as previously stated, a comparison between the actual valve lift value LACT and the insensitive zone defining value $l_0$ is made at the comparator 60, and the memory output-selector circuit 32 operates on the resulting output from the comparator 60 indicative of whether to select the EGR operation or the non-EGR operation, to cause the TiM value in the non-EGR operation TiM map memory 28 or the EGR operation TiM map memory 29 to be supplied to the TiM value control circuit 32.

Although in the foregoing embodiment two TiM maps applicable during EGR operation and during non-EGR operation are provided for the main injectors alone, similar TiS maps may also be provided for the subinjector.

What is claimed is:

1. An electronic fuel supply control system for combination with an internal combustion engine having an intake passage, an exhaust passage, exhaust gas recirculating means for returning part of exhaust gases from said exhaust passage to said intake passage, and fuel delivery means, said electronic fuel injection control system comprising: means for driving said fuel delivery means; first sensor means for detecting a first parameter representing operating condition of the engine and generating a first signal indicative of a detected value of said first parameter; second sensor means for detecting a second parameter representing operating condition of the engine and generating a second signal indicative of a detected value of said seond parameter; first memory means storing a first group of predetermined output values being functions of the first and second signals; second memory means storing a second group of predetermined output values being functions of the first and second signals but different from the predetermined output values in the first group; means for determining whether or not the exhaust gas recirculation is being carried out by said exhaust gas recirculating means; and selector means responsive to an output signal from said exhaust gas recirculation determining means to selectively allow one of said first and second groups of predetermined output values in said first and second memory means to be supplied to said driving means; whereby said driving means is operable to drive said fuel delivery means so as to supply quantities of fuel corresponding to output values in the selected one of said first and second groups to the engine.

2. The electronic fuel supply control system as claimed in claim 1, wherein said fuel delivery means comprises at least one fuel injection valve, and said driving means is operable to open said fuel injection valve for periods of time corresponding to output values in the selected one of said first and second groups.

3. The electronic fuel supply control system as claimed in claim 1, wherein said exhaust gas recirculating means comprises an exhaust gas recirculating passage connecting said exhaust passage of the engine to said intake passage of same, and an exhaust gas recirculation valve arranged across said exhaust gas recirculating passage, said electronic fuel injection control system further comprising valve opening command means for generating a command signal indicative of command values for required valve opening of said exhaust gas recirculation valve, third sensor means for detecting the valve opening of said exhaust gas recirculation valve and generating a signal indicative of a detected value of the valve opening, and control means responsive to the difference between a value of said detected valve opening signal and a command value indicated by said command signal for controlling the valve opening of said exhaust gas recirculation valve.

4. The electronic fuel supply control system as claimed in claim 3, wherein said exhaust gas recirculation determining means comprises arithmetic means for multiplying a command value indicated by said command signal which is outputted when said exhaust gas recirculation valve is fully closed, and indicative of opening of the same valve, by a predetermined coefficient having a value less than 1, and generating the resulting product value, and determining means for comparing said product value with a value of said detected valve opening signal, to determine that the exhaust gas recirculation is being carried out, when the product value is smaller than the value of said detected valve opening signal, and to determine that the exhaust gas recirculation is not being carried out, when the product value is equal to or larger than the value of said detected valve opening signal.

5. The electronic fuel supply control system as claimed in claim 4, wherein said exhaust gas recirculation determining means further comprises means for generating a predetermined insensitive zone defining value of the valve opening action of said exhaust gas recirculation valve, and means for comparing a product value from said arithmetic means with said predetermined insensitive zone defining value and supplying said insensitive zone defining value to said determining means for comparison with a value of said detected valve opening period when said predetermined insensitive zone defining value is larger than said product value.

6. The electronic fuel supply control system as claimed in claim 3, wherein said valve opening command means includes third memory means storing valve opening command values being functions of said first and second signals.

7. The electronic fuel supply control system as claimed in claim 3, wherein said exhaust gas recirculating determining means comprises arithmetic means for multiplying a command value indicated by said command signal immediately preceding one which is outputted when said exhaust gas recirculation valve is opened, and indicative of full closing of the same valve, by a predetermined coefficient having a value less than 1, and generating the resulting product value, and determining means for comparing said product value with a value of said detected valve opening signal, to determine that the exhaust gas recirculation is being carried out, when said product value is smaller than the value of said detected valve opening signal, and to determine that the exhaust gas recirculation is not being carried out, when said product value is equal to or larger than the value of said detected valve opening signal.

8. The electronic fuel supply control system as claimed in claim 7, wherein said exhaust gas recirculation determining means further comprises means for generating a predetermined insensitive zone defining value of the valve opening action of said exhaust gas recirculation valve, and means for comparing a product value from said arithmetic means with said predetermined insensitive zone defining value and supplying said insensitive zone defining value to said determining means for comparison with a value of said detected valve opening period when said predetermined insensitive zone defining value is larger than said product value.

9. The electronic fuel supply control system as claimed in claim 4, wherein said valve opening command means includes third memory means storing valve opening command values being functions of said first and second signals.

10. The electronic fuel supply control system as claimed in claim 5, wherein said valve opening command means includes third memory means storing valve opening command values being functions of said first and second signals.

* * * * *